United States Patent [19]

Oppenlaender et al.

[11] 4,388,214
[45] Jun. 14, 1983

[54] IMIDAZOLINE BASED CORROSION INHIBITORS WHICH INHIBIT CORROSION CAUSED BY $CO_2$ AND $H_2S$

[75] Inventors: Knut Oppenlaender, Ludwigshafen; Karl Stork, Lampertheim; Klaus Barthold, Mannheim, all of Fed. Rep. of Germany

[73] Assignee: BASF Aktiengesellschaft, Ludwigshafen, Fed. Rep. of Germany

[21] Appl. No.: 352,635

[22] Filed: Feb. 26, 1982

[51] Int. Cl.$^3$ .................. C23F 11/14; C23F 11/12
[52] U.S. Cl. ...................... 252/392; 106/14.14; 106/14.15; 106/14.31; 208/47; 252/8.55 E; 422/12
[58] Field of Search ............... 252/392, 391, 8.55 E, 252/357; 106/14.14, 14.15, 14.31; 208/47; 422/12

[56] References Cited

U.S. PATENT DOCUMENTS

| | | | |
|---|---|---|---|
| 2,926,169 | 2/1960 | Hughes | 252/8.55 E |
| 3,150,147 | 9/1964 | Udelhofen | 252/392 |
| 3,674,804 | 7/1972 | Redmore | 252/8.55 E |
| 4,057,390 | 11/1977 | Quinlan | 252/8.55 E |
| 4,347,154 | 8/1982 | Simmons | 252/392 |

*Primary Examiner*—Irwin Gluck
*Attorney, Agent, or Firm*—David L. Hedden; Joseph D. Michaels

[57] ABSTRACT

The subject invention relates to corrosion inhibitors prepared by reacting certain imidazolines or precursors thereof with sulfur. The corrosion inhibitors are particularly useful in inhibiting corrosion of metal tanks caused by $CO_2$ and $H_2S$ ("acid gas") during the transport and storage of crude oils.

6 Claims, No Drawings

IMIDAZOLINE BASED CORROSION INHIBITORS WHICH INHIBIT CORROSION CAUSED BY CO₂ AND H₂S

BACKGROUND OF THE INVENTION

1. Field of the Invention

The subject invention relates to corrosion inhibitors prepared by reacting certain imidazolines or precursors thereof with sulfur. The corrosion inhibitors are particularly useful in inhibiting the corrosion of metal tanks caused by $CO_2$ and $H_2S$ ("acid gas") during the transport and storage of crude oils.

2. Description of the Prior Art

It is known to inject a solution or dispersion of corrosion inhibitors into crude oil during oil recovery and during the transport or storage of oil so that a protective layer forms on the surfaces of the metal parts coming into contact with the oil. The crude oil emulsions usually contain saltwater and in many cases, depending upon the origin of the oil, $H_2S$ and $CO_2$ which have a pronounced corrosive effect. The corrosion inhibitors to be used for this purpose should be soluble in oil and should at least be dispersible in saltwater so that they can have an optimum effect.

German Published Application No. 2,846,979 describes corrosion inhibitors for this purpose which consist of an imidazoline salt, an oil-soluble solvent for the imidazoline salt, and a hydrocarbon oil. The problem with these inhibitors, however, is that the imidazoline salts described in the referenced literature do not sufficiently suppress the corrosion caused by $H_2S$ and $CO_2$, which are often present in the crude oil which is essentially a water-in-oil emulsion, particularly a saltwater-in-oil emulsion. In addition to this, the use of imidazolines under these circumstances is complicated because they must be used together with specific solvents. Moreover, the costs of the hydrocarbon oil is high.

U.S. Pat. No. 3,062,612 describes a process for preventing the corrosion of iron from acid corrosion whereby a finely distributed sulfur together with, among other things, long chained fatty acids, aliphatic amines and/or quaternary ammonium salts of these amines, imidazolines, or organic sulfides are added to the corroding medium. However, this patent relates to a different problem than the subject invention, (it is concerned with corrosion protection agents used for aqueous acid solutions and not for water-in-oil emulsions where the question of solubility is of significant importance) and only ethoxystearylimidazoline is mentioned by way of example in addition to other amines. The imidazoline precursors which are used in accordance with the subject invention to prepare the corrosion inhibitors are not described anywhere in this patent. Furthermore, it has been shown that a mixture of elementary sulfur and ethoxystearylimidazoline brings about totally unsatisfactory results with respect to corrosion protection when used according to this invention in an $H_2S$ containing saltwater-in-oil emulsion.

SUMMARY OF THE INVENTION

The subject invention relates to corrosion inhibitors which are the reaction product of (A) a compound selected from the group consisting of
   1. an imidazoline or salt thereof having the following structural formula

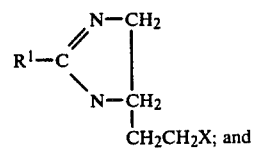

2. a precursor thereof having the following structural formula:

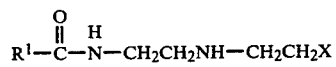

wherein
$R^1$ is a $C_6$ to $C_{22}$, preferably $C_8$ to $C_{17}$, alkyl or alkenyl radical;
X is OH, $NH_2$, or

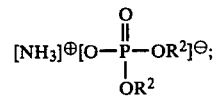

and $R^2$ is a $C_4$ to $C_{18}$, preferably $C_7$ to $C_{17}$, alkyl radical; and
(B) elementary sulfur;
wherein (A) and (B) are reacted at 100° C. to 200° C. within 1 to 3 hours in a weight ratio of (A) to (B) of 100:1 to 2:1.

The corrosion inhibitors are particularly useful for inhibiting corrosion caused by the $CO_2$ and $H_2S$ in crude oil stored in metal containers. Crude oil is essentially an oil-in-water emulsion, more specifically a saltwater-in-oil emulsion. The subject inhibitors can be metered in a simple manner.

DESCRIPTION OF THE PREFERRED EMBODIMENT

The preparation of the imidazoline derivatives is part of the current state of the art and does not require any detailed explanation. Normally acids having the formula $R^1COOH$ are reacted with diethylenetriamine or aminoethylethanolamine at approximately 70° C. to 130° C. which initially results in the acid amide of formula (Ia) which can be used by itself. $R^1$ in this case has the meaning identified for formula (I) previously set forth.

Following this process the product is further reacted at approximately 190° C. to 250° C. resulting in the production of imidazoline which can be converted into the ammonium salt by further reaction with the dialkylorthophosphoric ester after the acid has been reacted with diethylenetriamine in the first stage.

Acids having the formula $RR^1COOH$ which can be used include 2-ethylhexanoic acid, nonanoic acid, oleic acid, stearic acid, lauric acid, elaidic acid as well as mixtures of natural fatty acids such as coconut or tallow fatty acid.

Orthophosphoric diesters which can be used include those which are derived from amyl alcohol, n-hexanol, n-heptanol, n-octanol, 2-ethylhexanol, nonanols, decanols and isotridecanol, stearyl alcohol, oleic alcohol as well as the $C_9/C_{11}$- and $C_{13}/C_{15}$-fractions originating from the oxosynthesis. The $C_8/C_{10}$, $C_{10}/C_{12}$ and $C_{14}/C_{16}$-alcohol mixtures derived from the Ziegler synthesis may also be used.

Particularly useful in preparing the subject corrosion inhibitors are imidazolines or imidazolinium phosphate ester salts which are derived from the $C_{12}$ to $C_{20}$-carboxylic acids, for instance, compounds having the formulae

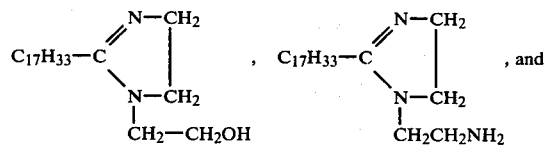

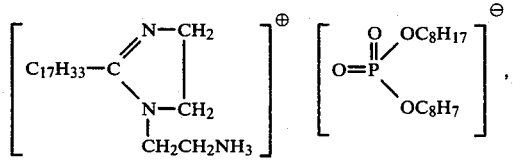

as well as the corresponding $C_{17}H_{35}$ derivatives.

The imidazoline derivatives and/or their precursors (A) are subsequently mixed with sulfur (B) which should advantageously be present in its colloidal form (that is, as sublimated sulfur) and are subsequently brought to reaction by heating to 100° C. to 200° C. for 1 to 3 hours. The weight ratio of A:B is 100:1 to 2:1, preferably 100:1 to 4:1.

The resultant compositions which can be added to the water-in-oil emulsions in free form provide optimum protection against $H_2S$ and $CO_2$ corrosion. Depending upon the origin and/or the compositions of the crude oil emulsion, these compositions are used in quantities of 50 to 1000 ppm relative to the weight of the emulsion.

The following examples more specifically explain the invention, but are not intended to limit the scope of its application.

EXAMPLES

In the following examples the effectiveness of the corrosion inhibitors was tested as follows:

Iron sheet metal having dimensions of 130 mm×10 mm×1 mm was selected as test material. These sheet metal strips were sanded, degreased with toluene, and weighed. Test gasoline, containing in emulsified form, saltwater with 3 percent NaCl, relative to the water, was used as a test medium. The emulsion contained 50 percent by weight of saltwater and was saturated with $H_2S$ and $CO_2$.

To the emulsion was added 250 ppm of inhibitor relative to the weight of the emulsion.

The degreased and weighed sheet metal strips were subsequently introduced into the emulsions and were subjected to mechanical movement (40 rpm imparted by a shaft turning the test vessels) at 80° C. for 16 hours.

The strips of test metal were then cleaned with an inhibited acid, were degreased, and were weighed after drying in order to determine the weight loss. The results were evaluated and compared with blank values (emulsions without the inhibitor added).

The results are shown in the following tables. In addition to the blank values, these tables also show the results obtained with imidazolines alone (without sulfur) and with ethoxystearylimidazoline in accordance with U.S. Pat. No. 3,062,612.

The compounds used as component A in Examples 1 to 10 had the following structural formula and were used in amounts of 250 ppm:

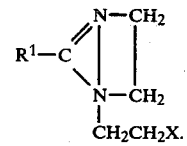

TABLE I (Examples 1-10)

| Example | $R^1$ | X | Percent S* | Amount Eroded in mg |
|---|---|---|---|---|
| 1 | Blank Sample | — | — | 109.9 |
| 2 | i-$C_8H_{17}$ | $NH_2$ | 0 | Pitting |
| 3 | i-$C_{17}H_{33}$ | OH | 0 | 81.3 (pitting) |
| 4 | i-$C_8H_{17}$ | $NH_2$ | 1/5/10 | 37.2/33.6/32.2 |
| 5 | $C_{17}H_{33}$ | $NH_2$ | 5/20 | 30.0/27.3 |
| 6 | $C_{17}H_{35}$ | OH | 1/5/10 | 32.3/24.0/23.5 |
| 7 | $C_{17}H_{35}$ | $NH_2$ | 1/5 | 38.4/33/9 |
| 8 | $C_{17}H_{33}$ | OH | 15/20/30 | 25.6/21.7/19.3 |
| 9 | i-$C_8H_{17}$ | $NH_2$ | 15/30 | 32.8/32.5 |
| 10 | Ethoxy-stearyl-imidazoline | — | 10/20** | 68.5/57.3 |

*Incorporated by heating with imidazoline derivative to 150° C. within 2 hours (clear solutions)
**In accordance with U.S. Pat. No. 3,062,612 was added and mixed as colloidal aqueous solution The compounds used as component A in Examples 11 to 19 had the following structural formula and were used in amounts of 250 ppm:

TABLE II (Examples 11-19)

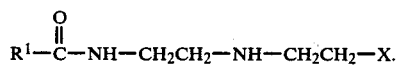

| Example | $R^1$ | X | Percent S* | Amount Eroded in mg |
|---|---|---|---|---|
| 11 | Blank Sample | — | — | 114.9 |
| 12 | $C_{17}H_{33}$ | OH | 5/10/20 | 49.6/36.0/28.4 |
| 13 | $C_{12}H_{35}$ | OH | 5/10/20 | 43.6/24.9/24.8 |
| 14 | Tallow fatty alkyl | OH | 5/10/30 | 50.6/26.3/23.5 |
| 15 | Tallow fatty alkyl | $NH_2$ | 1/5/10 | 31.5/28.1/27.8 |
| 16 | Colza oil fatty alkyl | OH | 5/10/50 | 28.5/25.5/26.2 |
| 17 | Colza oil fatty alkyl | $NH_2$ | 1/5/10 | 33.2/31.5/28.5 |
| 18 | $C_{17}H_{33}$ | $NH_2$ | 1/5/10 | 29.4/27.0/25.5 |
| 19 | $C_{17}H_{33}$ | $NH_2$ | 0 | 95.8 |

*Incorporated as set forth in Table I.

The compounds used as component A in Examples 20 to 25 had the following structural formula and were used in amount of 200 ppm.

TABLE III (Examples 20-25)

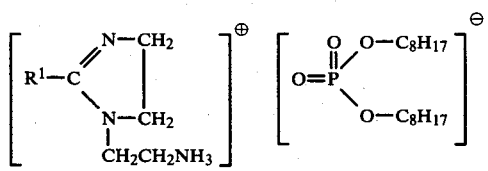

| Example | $R^1$ | Percent S* | Amount Eroded |
|---|---|---|---|
| 20 | Blank Sample | — | 114.3 |
| 21 | i-$C_8H_{17}$ | 0 | 112.5 |

TABLE III-continued
(Examples 20-25)

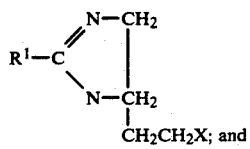

| Example | $R^1$ | Percent S* | Amount Eroded |
|---------|-------|------------|---------------|
| 22 | $C_{17}H_{33}$ | 0 | 113.1 |
| 23 | $C_8H_{17}$ | 1/5/10 | 33.0/29.9/32.0 |
| 24 | $C_{17}H_{33}$ | 1/5/30 | 28.7/25.0/24.2 |
| 25 | $C_{17}H_{35}$ | 1/5/50 | 29.4/28.5/26.3 |

*Incorporated in accordance with the data put forth in Table I

Examples 1 to 25 show the effectiveness of the corrosion inhibitors described and used in accordance with present invention.

I claim:

1. A corrosion inhibitor comprising the reaction product of
(A) a compound selected from the group consisting of
  (1) an imidazoline or salt thereof having the following structural formula

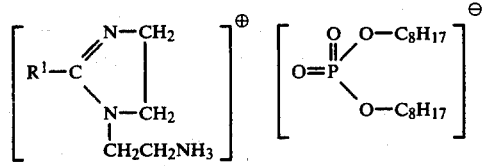 (I)

(2) a precursor thereof having the following structural formula:

 (Ia)

wherein
$R^1$ is a $C_6$ to $C_{22}$ alkyl or alkenyl radical;
X is OH, $NH_2$, or

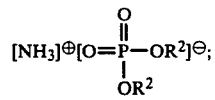

and
$R^2$ is a $C_4$ to $C_{18}$ alkyl radical; and
(B) elementary sulfur;
wherein (A) and (B) are reacted at 100° C. to 200° C. within 1 to 3 hours in a weight ratio of (A) to (B) of 100:1 to 2:1.

2. The corrosion inhibitor of claim 1 wherein $R^1$ is $C_8H_{17}$ or $C_{17}H_{33}$.

3. The corrosion inhibitor of claim 2 wherein X is OH or $NH_2$.

4. A process for inhibiting the corrosion of metal caused by $H_2S$ and $CO_2$ in oil-in-water emulsions containing $H_2S$ and/or $CO_2$ comprising
adding a corrosion inhibitor prepared in accordance with claim 1 to an oil-in-water emulsion.

5. The process of claim 4 wherein the oil-in-water emulsion is a saltwater-in-oil emulsion.

6. The process of claim 4 or 5 wherein the amount of corrosion inhibitor added to the oil-in-water emulsion is from 50 to 1000 ppm by weight based upon the weight of said emulsion.

* * * * *